No. 874,995. PATENTED DEC. 31, 1907.
F. SAMUELSON.
SHAFT PACKING.
APPLICATION FILED JUNE 20, 1906.

Witnesses:
Burchard V. Kelley
Alex F. Macdonald

Inventor:
Frederick Samuelson
by Albert G. Davis
Atty.

ially for use in connection with steam tur-
UNITED STATES PATENT OFFICE.

FREDERICK SAMUELSON, OF RUGBY, ENGLAND, ASSIGNOR TO GENERAL ELECTRIC COMPANY, A CORPORATION OF NEW YORK.

SHAFT-PACKING.

No. 874,995.

Specification of Letters Patent.

Patented Dec. 31, 1907.

Application filed June 20, 1906. Serial No. 322,602.

*To all whom it may concern:*

Be it known that I, FREDERICK SAMUELSON, a subject of the King of Sweden, residing at Rugby, England, have invented certain new and useful Improvements in Shaft-Packings, of which the following is a specification.

My invention relates to shaft packings intended for general application but more especially for use in connection with steam turbines and relates more particularly to a packing of that type which will permit of slight lateral movement of the shaft relatively to the turbine casing to take place without impairing the efficiency of the joint between them. Its object is to provide an improved packing in which the parts are simple and inexpensive to manufacture and are light in weight so that inertia is reduced to a minimum.

Figure 1:
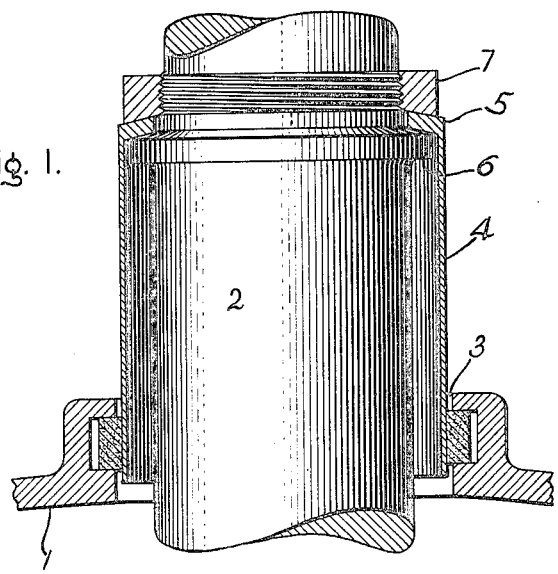
Figure 2:
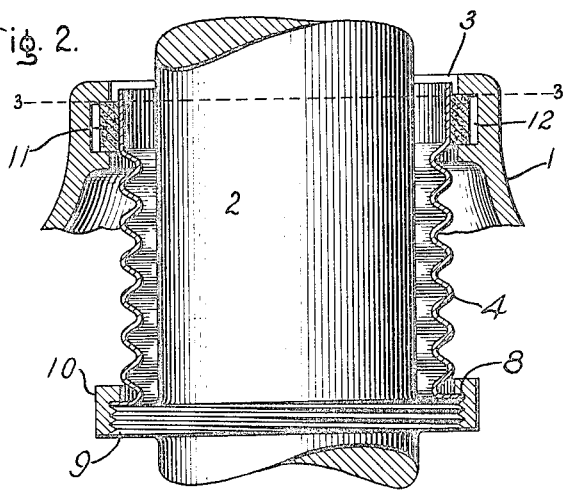
Figure 3:
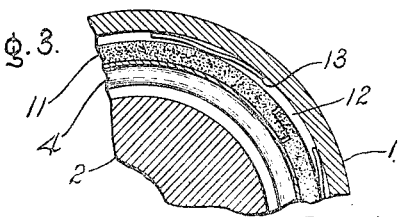

In the accompanying drawing, which illustrates certain embodiments of the invention, Figure 1 is a longitudinal section of the packing; Fig. 2 is a similar section of a modified construction; and Fig. 3 is a detail view.

Referring to the drawing, 1 represents a casing adapted to contain fluid under pressure and 2 is a rotary shaft extending through the opening 3 in the wall of the casing. The shaft carries a sleeve 4 which at one end is turned or flanged inwardly, as shown at 5, Fig. 1, and clamped between the abutment or shoulder 6 on the shaft, which forms a seat for the transversely-extending portion of the sleeve and a nut 7 which screws on the shaft. Or, as shown in Fig. 2, the sleeve may be turned outwardly as indicated at 8, and clamped between a threaded abutment 9 formed on or attached to the shaft and a nut 10 engaging the thread of the abutment. The free end of the sleeve is engaged by the stationary packing ring 11 fitted in the wall of the opening 3. This packing ring may be of any suitable construction, as, for example, it may be composed of segmental blocks of carbon located in the seat or groove 12 of the casing and held in contact with the sleeve by any suitable device, such, for instance, as radially acting springs 13, Fig. 3. The sleeve 4 may be arranged so that the space between it and the shaft is exposed to the fluid pressure within the casing, as shown in Fig. 1, or it may be arranged so that the fluid pressure acts on its outer surface, as shown in Fig. 2.

The sleeve is preferably constructed of a material suitable to stand a high temperature and also to resist the fluid pressure without becoming distorted. It may be constructed of a plain or corrugated tube of sheet metal which has sufficient stiffness to resist the fluid pressure, but which is flexible enough to allow movement of the shaft without breaking the joint which it makes with the carbon ring at its free end. The packing may be used to prevent the escape of fluid from the casing or the entrance of air thereto.

In accordance with the provisions of the patent statutes, I have described the principle of operation of my invention together with the apparatus which I now consider to represent the best embodiment thereof; but I desire to have it understood that the apparatus shown is only illustrative and that the invention can be carried out by other means.

What I claim as new and desire to secure by Letters Patent of the United States, is,—

1. The combination of a shaft, a flexible sleeve surrounding and secured at one end to the shaft to rotate therewith and arranged with its body spaced from the shaft to permit of relative transverse movement, a stationary packing ring engaging the free end of the sleeve, and a support for the packing ring which is independent of the sleeve.

2. The combination of a shaft, a flexible sheet metal sleeve surrounding the shaft with a space between and provided with a transversely-extending portion, an abutment on the shaft forming a seat for the transversely-extending portion, means engaging the transversely-extending portion for securing it to the abutment and forming therewith a fluid-tight joint, a packing ring engaging the free end of the sleeve, and a support for the packing which is independent of the sleeve.

In witness whereof, I have hereunto set my hand this 20th day of April, 1906.

FREDERICK SAMUELSON.

Witnesses:
K. AHLQUIST,
E. G. BATT.